United States Patent
Suzuki (10) Patent No.: US 12,258,220 B2
(45) Date of Patent: Mar. 25, 2025

(54) TRANSPORT SYSTEM

(71) Applicant: MURATA MACHINERY, LTD., Kyoto (JP)

(72) Inventor: Tatsuro Suzuki, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 610 days.

(21) Appl. No.: 17/671,632

(22) Filed: Feb. 15, 2022

(65) Prior Publication Data
US 2022/0281691 A1 Sep. 8, 2022

(30) Foreign Application Priority Data

Mar. 2, 2021 (JP) ................. 2021-032746

(51) Int. Cl.
*G06F 7/00* (2006.01)
*B65G 17/12* (2006.01)
*B65G 43/10* (2006.01)
*B65G 47/46* (2006.01)

(52) U.S. Cl.
CPC ............. *B65G 43/10* (2013.01); *B65G 17/12* (2013.01); *B65G 47/46* (2013.01)

(58) Field of Classification Search
CPC ........ B65G 43/10; B65G 17/12; B65G 47/46; B65G 43/00
USPC ................................ 700/213, 228, 230–231
See application file for complete search history.

(56) References Cited

U.S. PATENT DOCUMENTS

| | | | | |
|---|---|---|---|---|
| 7,577,517 B2* | 8/2009 | Nagasawa | ................ | G08G 1/20 700/229 |
| 2019/0344967 A1* | 11/2019 | Tomoda | ................ | B65G 17/12 |
| 2021/0347577 A1 | 11/2021 | Hayashi et al. | | |

FOREIGN PATENT DOCUMENTS

| | | |
|---|---|---|
| JP | 2003-95423 A | 4/2003 |
| JP | 2005-165914 A | 6/2005 |
| JP | 2007-176617 A | 7/2007 |
| JP | 2020-15560 A | 1/2020 |

* cited by examiner

Primary Examiner — Yolanda R Cumbess
(74) Attorney, Agent, or Firm — Keating & Bennett, LLP (57) ABSTRACT

A transport system includes a vehicle, a dispenser, a body controller, a vehicle controller, and a restart command generator. When the transport system is stopped due to a problem and then the restart command generator commands a restart of the transport system, the body controller transmits check information to the vehicle controller. The vehicle controller performs a consistency process based on check information when the transport system is normal and check information when the restart of the transport system is commanded. If there is a vehicle determined to have a problem by the consistency process, the vehicle controller commands the body controller to cancel the check information regarding the vehicle and/or to dispense an article supported by the vehicle for transport to the dispenser.

5 Claims, 6 Drawing Sheets

TRANSPORT SYSTEM

CROSS REFERENCE TO RELATED APPLICATIONS

This application claims the benefit of priority to Japanese Patent Application No. 2021-032746 filed on Mar. 2, 2021. The entire contents of this application are hereby incorporated herein by reference.

BACKGROUND OF THE INVENTION

1. Field of the Invention

The present invention relates to a transport system including a vehicle to transport an article and a controller to control the vehicle.

2. Description of Related Art

In the related art, a vehicle that transports an article by traveling on a predetermined traveling route with thrust of a linear motor has been known (see Japanese Unexamined Patent Publication No. 2020-15560, for example). In addition, a transport system including a vehicle that transports an article, a client controller that controls the vehicle, and a host controller that gives a command related to transport of the article to the client controller has been known.

In the transport system, the client controller and the host controller appropriately cooperate with each other to cause the vehicle to transport the article. Therefore, the client controller and the host controller transmit and receive information regarding the transport of the article to and from each other.

Specifically, the client controller monitors a transport status of the article by the vehicle, and transmits a report on an operation of the vehicle to the host controller every time the vehicle performs the operation related to the transport of the article. Thus, the host controller can determine the current status of the transport of the article and transmit an appropriate command to the client controller.

When a problem occurs in the transport system as described above and the transport of the article in the transport system is stopped, an inconsistency may occur between the transport status of the article, which is determined by the client controller, and the transport status of the article, which is determined by the host controller. If the system is restarted while such inconsistency remains, there is a possibility that the operation of the transport system is not normally performed. Thus, it is necessary to eliminate the inconsistency before restarting the transport system.

In the related art, an operator who performs maintenance of the transport system performs the maintenance across the client controller and the host controller to eliminate this inconsistency. It takes a long time to eliminate such inconsistency.

SUMMARY OF THE INVENTION

Preferred embodiments of the present invention each prevent, when an inconsistency occurs between information determined by a client controller and information determined by a host controller due to a problem in a transport system including the client controller and the host controller, an occurrence of a situation in which the transport system is abnormally stopped due to the inconsistency.

Hereinafter, a plurality of aspects of various preferred embodiments of the present invention will be described. These aspects can be freely combined as necessary or desired.

A transport system according to an aspect of a preferred embodiment of the present invention is a system for transporting an article. The transport system includes a vehicle, a dispenser, a first controller, a second controller, and a restart command generator.

The vehicle transports an article.

An article, the transport of which is to be stopped, is dispensed to the dispenser.

The first controller is configured or programmed to control the vehicle based on an operation command related to the transport of the article, and generate and store check information indicating an operation status of the vehicle.

The second controller is configured or programmed to transmit the operation command to the first controller, and receive and store the check information from the first controller.

The restart command generator commands a restart of the transport system.

When the transport system is stopped due to a problem and then the restart command generator commands a restart of the transport system, the first controller is configured or programmed to transmit the check information to the second controller.

The second controller is configured or programmed to perform a consistency process based on the check information received from the first controller and stored in the second controller when the transport system is normal, and the check information received from the first controller by a command of the restart of the transport system after the transport system is stopped due to the problem. If the consistency process determines that there is a vehicle having a problem, the second controller is configured or programmed to command the first controller to cancel (e.g., delete) the check information regarding the vehicle and/or to dispense the article supported by the vehicle to the dispenser.

In the above transport system, when the transport system is stopped due to an occurrence of the problem and then a command to restart the transport system is issued, the first controller is configured or programmed to transmit to the second controller the check information stored and saved when the transport system is restarted.

The second controller is configured or programmed to perform the consistency process based on the check information which is received from the first controller when the transport system is normal, and stored and saved when the transport system is restarted, and the above check information received from the first controller by the command of the restart of the transport system after the transport system is stopped due to the problem.

When, as a result of the consistency process, an inconsistency occurs between a state of the vehicle, which is determined by the first controller at time of restarting, and a state of the vehicle, which is determined by the second controller at the time of restarting and when the transport system is normal, it is determined that the problem has occurred in this vehicle.

If there is the vehicle in which the problem has occurred, the second controller is configured or programmed to command the first controller to cancel the check information related to the vehicle in which the problem has occurred and/or to dispense to the dispenser the article supported for the transport by the vehicle in which the problem has occurred.

As described above, consistency between the states of the vehicle, which are determined by the first controller and the second controller, is automatically checked. When an inconsistency has occurred between the states of the vehicle, which are determined by the two controllers, the first controller is configured or programmed to automatically perform a process of deleting the check information of the vehicle in which the inconsistency has occurred, and/or control of dispensing the article supported for the transport by the vehicle in which the inconsistency has occurred (that is, transport of this article is not continued).

Thus, when an inconsistency has occurred between information determined by the first controller due to the problem in the transport system and information when the transport system is normal, which is determined by the second controller, it is possible to prevent an occurrence of a situation in which the transport system is abnormally stopped due to the inconsistency.

The transport system may further include a load detector. The load detector is provided at a first position of a traveling route of the vehicle, and detects whether or not the vehicle at the first position supports the article.

In this case, when the restart command generator commands the restart of the transport system, the first controller may perform traveling control to cause the vehicle to pass through the first position, and transmit a detection result of whether or not the vehicle that has passed through the first position supports the article, to the second controller.

In addition, the second controller may perform the consistency process based on the check information received from the first controller and stored in the second controller when the transport system is normal, the check information received from the first controller by a command of the restart of the transport system after the transport system is stopped due to a problem, and the detection result.

Thus, it is possible to determine consistency more accurately between the pieces of the information of the vehicle, which are determined by the two controllers including the information on whether or not the article for transport is actually supported by the vehicle.

The transport system may further include a third controller. The third controller is configured or programmed to transmit a transport command to generate the operation command to the second controller.

In this case, the second controller may transmit progress information regarding a progress status of the transport of the article by the vehicle to the third controller. In addition, if there is a vehicle determined to have a problem by the consistency process, the second controller may command the third controller to cancel the progress information of the vehicle.

Thus, it is possible to eliminate inconsistency in a higher controller (that is, the third controller) that manages the transport of the article in the entire transport system.

The third controller may be configured or programmed to receive a command to cancel the progress information from the second controller, and then command the second controller to dispense the article supported for the transport by the vehicle of which the progress information is canceled, to the dispenser.

Thus, it is possible to eliminate the inconsistency in the higher controller that manages the transport of the article in the entire transport system.

In the transport system, a plurality of vehicles may be present. In addition, each of the plurality of vehicles may have a different piece of identification information. In this case, the transport system may further include a reader. The reader is provided at a second position of the traveling route of the vehicle, and reads identification information of the vehicle at the second position.

In addition, when the restart command generator commands the restart of the transport system, the first controller may perform traveling control of causing a plurality of vehicles to pass through the second position, generate and store arrangement order information indicating an arrangement order of the plurality of vehicles in the traveling route, and transmit the arrangement order information to the second controller.

Thus, in the transport system including the plurality of vehicles, it is possible to perform the consistency process in consideration of the arrangement order of the plurality of vehicles.

In transport systems according to preferred embodiments of the present invention, it is possible to prevent an occurrence of a situation in which the transport system is abnormally stopped due to the inconsistency between the information determined by the first controller and the information determined by the second controller.

The above and other elements, features, steps, characteristics and advantages of the present invention will become more apparent from the following detailed description of the preferred embodiments with reference to the attached drawings.

DETAILED DESCRIPTION OF PREFERRED EMBODIMENTS

Figure 1:
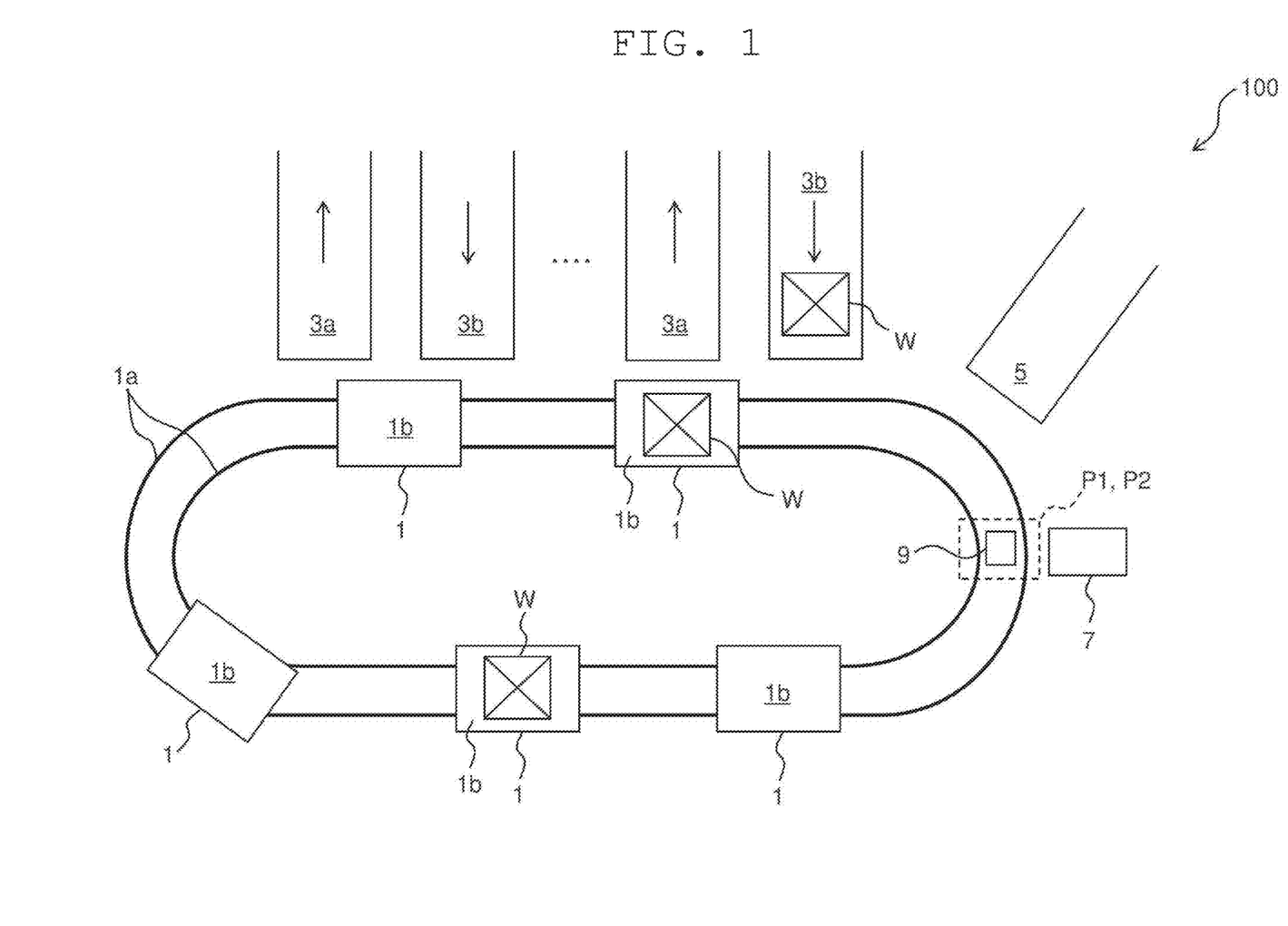
FIG. 1 is a diagram illustrating a configuration of a transport system.
Figure 2:
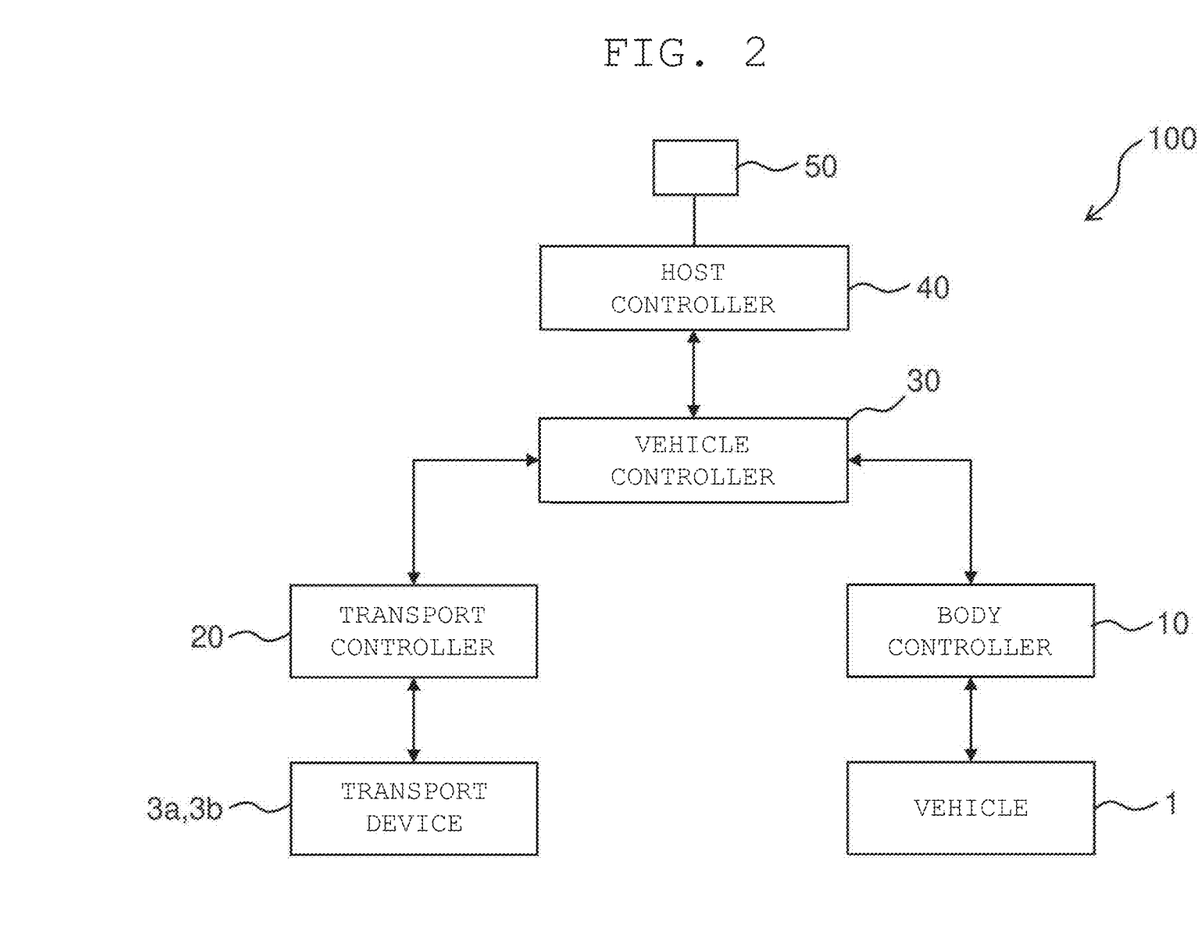
FIG. 2 is a diagram illustrating a control configuration of the transport system.

1. First Preferred Embodiment
(1) Configuration of Transport System
A configuration of a transport system 100 according to a first preferred embodiment will be described with reference to FIGS. 1 and 2. FIG. 1 is a diagram illustrating the configuration of the transport system 100. FIG. 2 is a diagram illustrating a control configuration of the transport system 100.

The transport system 100 is a system for transporting an article W. The transport system 100 includes a plurality of vehicles 1, transport devices 3a and 3b, a dispenser 5, a load detector 7, and a reader 9. The transport system 100 includes, as a control configuration, a body controller 10 (an example of a first controller), a transport controller 20, a vehicle controller 30 (an example of a second controller), a host controller 40 (an example of a third controller), and a restart command generator 50.

The vehicle 1 is a vehicle that travels on a pair of traveling rails 1a with thrust generated by a linear motor. The vehicle 1 transports the article W in the transport system 100 in a manner that the vehicle 1 travels along the pair of traveling rails 1a in a state where the article W is placed on a placement portion 1b provided on the upper surface of the vehicle 1. Each of the plurality of vehicles 1 has a different piece of identification information. The identification information of the vehicle 1 is, for example, machine information of the vehicle 1. The identification information of the vehicle 1 is indicated by, for example, a barcode attached to the vehicle 1.

The transport devices 3a and 3b are devices capable of transporting an article W, such as a conveyor provided along the pair of traveling rails 1a, for example. The transport device 3a transports the article W transferred from the vehicle 1 to a predetermined place (unloading). The transport device 3b transfers the article W transported from a predetermined place to the vehicle 1 (loading). The arrangement and number of the transport devices 3a and 3b in the transport system 100 can be freely changed depending on the scale of the transport system 100 and the like.

The dispenser 5 is a dispensing station to which the article W of which transport is to be stopped is dispensed. The dispenser 5 is provided at a predetermined position near the traveling rail 1a.

"Dispensing of the article W" means that the vehicle 1 that supports the article W is stopped in the dispenser 5, and the article W is moved from the placement portion 1b of the vehicle 1 into the dispenser 5. The article W is dispensed into the dispenser 5 when the vehicle 1 determined to have a problem by a consistency process stops the transport of the article W.

The dispenser 5 may be provided separately from the transport devices 3a and 3b, or a portion of a station used for unloading and/or loading during a normal operation may be used as the dispenser 5 as necessary.

The load detector 7 is provided near a first position P1 of the pair of traveling rails 1a (an example of a traveling route of the vehicle), and detects whether or not the article W is placed on the placement portion 1b of the vehicle 1 at the first position P1. The load detector 7 is, for example, a camera, a photoelectric sensor including a light emitter that generates a laser beam and a light receiver that receives the laser beam, or the like.

When the load detector 7 is a camera, and for example, when the presence of an image of the article W on the vehicle 1 at the first position P1 is recognized by image processing, it can be determined that the article W is placed on the placement portion 1b of the vehicle 1.

When the load detector 7 is a photoelectric sensor, and the light emitter and the light receiver of the photoelectric sensor are disposed with the pair of traveling rails 1a interposed therebetween, and for example, when a laser beam generated from the light emitter of the photoelectric sensor is blocked by the article W and is not received by the light receiver of the photoelectric sensor, it can be determined that the article W is placed on the placement portion 1b of the vehicle 1.

On the other hand, when the light emitter and the light receiver of the photoelectric sensor are disposed on the same side with respect to the pair of traveling rails 1a, and when the laser beam generated from the light emitter of the photoelectric sensor is reflected by the article W and received by the light receiver of the photoelectric sensor, it can be determined that the article W is placed on the placement portion 1b of the vehicle 1.

The reader 9 is provided at a second position P2 of the pair of traveling rails 1a, and reads the identification information of the vehicle 1 at the second position P2. The reader 9 is, for example, a barcode reader, and can determine which of the plurality of vehicles 1 is present at the second position P2, by reading a barcode indicating the identification information of the vehicle 1 (for example, the machine information of the vehicle 1).

As illustrated in FIG. 1, the second position P2 at which the reader 9 is provided is located at the same position as the first position P1 at which the load detector 7 is provided. Thus, it is possible to simultaneously determine whether or not the vehicle 1 has placed the article W on the placement portion 1b and the identification information of the vehicle 1. The first position P1 and the second position P2 may not be the same position, and the second position P2 may be located near the first position P1. The second position P2 may be located away from the first position P1.

(2) Control Configuration of Transport System

The body controller 10 is a computer system including a CPU, a storage device (RAM, ROM, and the like), and various interfaces, and controls the plurality of vehicles 1.

The body controller 10 calculates a signal for traveling control of each vehicle 1 and a signal for control of the placement portion 1b when the article W is transferred between each vehicle 1 and the transport devices 3a and 3b, based on an operation command (described later) related to an operation desired to be performed by the vehicle 1 for transporting the article W. Then, the body controller 10 outputs the signals to the vehicle 1 to be controlled.

The body controller 10 determines an operation status of each vehicle 1 in the transport system 100. Specifically, the body controller 10 determines the operation status of the vehicle 1 based on the details of the command when various controls are commanded to each vehicle 1, stores information (check information) indicating the determined operation status in the storage device of the computer system forming the body controller 10, and transmits the stored information to the vehicle controller 30.

In another preferred embodiment, for example, when a sensor is provided in the vehicle 1, the body controller 10 may determine the operation status of the vehicle 1 based on information from the sensor of the vehicle 1.

Further, the body controller 10 manages information (arrangement order information) regarding an arrangement order of the plurality of vehicles 1 on the traveling rail 1a. The arrangement order information includes the arrangement order of the plurality of vehicles 1 on the traveling rail 1a and information on a state of each vehicle 1. The information on the state of each vehicle 1 indicates, for example, any one of a state in which the vehicle 1 is guided to the traveling rail 1a and operated (line-input state), a state in which the vehicle 1 is inoperable (down-line input state), and a state in which the vehicle 1 is detached even from the traveling rail 1a (down-line-out state).

In the present preferred embodiment, when the restart of the transport system 100 is commanded, the body controller 10 performs an operation of checking the arrangement order of the plurality of vehicles 1 on the traveling rail 1a and the state of each vehicle 1 and generating the arrangement order information (machine check operation), and an operation of detecting whether or not the article W is placed on each vehicle 1.

After performing the above operation, the body controller 10 transmits the arrangement order information generated in the machine check operation to the vehicle controller 30. In addition, when performing the consistency process which will be described later, the body controller 10 transmits a detection result (load information) of whether or not the article W is placed on the vehicle 1, to the vehicle controller 30.

The transport controller 20 is a computer system including a storage device (RAM, ROM, and the like) and various interfaces, and controls the transport devices 3a and 3b based on a command from the vehicle controller 30.

The vehicle controller 30 is a computer system including a storage device (RAM, ROM, and the like) and various interfaces, and controls to manage the body controller 10. Specifically, the vehicle controller 30 is configured or programmed to generate an operation command based on a transport command (described later) received from the host controller 40, and transmit the operation command to the body controller 10.

The operation command is a command for an instruction of each operation to be performed by the vehicle 1 in the transport of the article W. Specifically, the operation command is, for example, a command to cause the vehicle 1 to travel, a command to causing the vehicle 1 to perform a loading operation, a command to cause the vehicle 1 to perform an unloading operation, or the like.

The command to perform the loading operation is, for example, a command to move the vehicle 1 to the target transport device 3b and transfer the article W from the target transport device 3b to the vehicle 1.

The command to perform the unloading operation is, for example, a command to move the vehicle 1 to the target transport device 3a and transfer the article W from the vehicle 1 to the target transport device 3a.

The vehicle controller 30 receives the check information, the arrangement order information, and the load information transmitted from the body controller 10, and stores the check information, the arrangement order information, and the load information in the storage device of the computer system of the vehicle controller 30.

When receiving the check information, the vehicle controller 30 determines a progress status of the transport of the article W by the vehicle 1 based on the check information, and generates information (progress information) indicating the determined progress status. The progress information is, for example, information for reporting that the loading operation by the vehicle 1 has been completed and information for reporting that the transport of the article W by the vehicle 1 has been completed. The generated progress information is transmitted to the host controller 40.

The number of pieces of progress information transmitted by the vehicle controller 30 is less than the number of pieces of check information received by the vehicle controller 30. That is, the progress information is not transmitted one by one during the operation of the transport system 100, but is transmitted when the transport status of the article is performed in the transport system 100 to some extent.

When the restart of the transport system 100 is commanded, the vehicle controller 30 performs the following process of checking consistency between the information of the body controller 10 and the information of the vehicle controller 30.

The vehicle controller 30 performs a process (called a machine check process) to check the consistency between (1) the arrangement order information transmitted from the body controller 10 after the machine check operation is performed and (2) the arrangement order information managed by the vehicle controller 30. When the arrangement order information is not consistent, the vehicle controller 30 updates the arrangement order information managed by the vehicle controller 30 so as to be consistent with the arrangement order information from the body controller 10.

In another preferred embodiment, when it is determined that the pieces of arrangement order information do not have consistency as a result of the machine check process, the vehicle controller 30 may report an occurrence of a problem indicating that the arrangement order information is not consistent, without updating the arrangement order information managed by the vehicle controller 30.

The vehicle controller 30 performs the consistency process based on (1) the above load information, (2) the check information stored by the body controller 10 at a timing at which the restart is commanded, and (3) the check information stored by the vehicle controller 30 at the timing at which the restart is commanded. That is, the check information stored by the vehicle controller 30 at the timing at which the restart is commanded is the check information received from the body controller 10 and stored in the vehicle controller 30 when the transport system 100 is normal.

The consistency process is a process of determining whether there is a contradiction (inconsistency) between the state of each vehicle 1, which is determined by the body controller 10 when the restart is commanded, and the state of each vehicle 1, which is determined by the vehicle controller 30, that is, the state of each vehicle 1 when the transport system 100 is normal.

When it is determined that there is no consistency between the state of each vehicle 1, which is determined by the body controller 10, and the state of each vehicle 1, which is determined by the vehicle controller 30, as a result of the above consistency process, the vehicle controller 30 determines that a problem has occurred in the vehicle 1 having no consistency.

The host controller 40 is a computer system including a storage device (RAM, ROM, and the like) and various interfaces, to manage the transport of the article W in the transport system 100. Specifically, the host controller 40 is configured or programmed to generate a transport command to transport the article W between the target transport devices 3a and 3b in the transport system 100, and transmits the transport command to the vehicle controller 30.

The host controller 40 stores the progress information received from the vehicle controller 30. Further, when a command of canceling the progress information stored in the host controller 40 is transmitted from the vehicle controller 30, as a result of the consistency process, the host controller 40 cancels the progress information and, as necessary, transmits, to the vehicle controller 30, a command of performing a rejection process (which will be described later) for the vehicle 1 in which the problem has occurred.

In this case, in the transport system 100, both a cancellation process and a rejection process which will be described later are performed.

The restart command generator 50 is, for example, an input interface (for example, a button, a keyboard, a mouse, a touch panel, or the like) that outputs a command to restart the transport system 100. In the present preferred embodiment, the restart of the transport system 100 is commanded to the host controller 40 by an operator operating the restart command generator 50 after the transport system 100 is stopped due to a problem.

The host controller 40 that has received this command transmits a command to restart the transport system 100 to the vehicle controller 30. Then, a restart process of the transport system 100 is started.

In another preferred embodiment, the restart command generator 50 may be provided in the host controller 40 as the configuration. In this case, the host controller 40 determines that a problem has occurred in the transport system 100, and performs the restart process when the transport system 100 needs to be restarted. That is, in this case, the host controller 40 can detect the occurrence of the problem in the transport system 100 and autonomously perform the restart process even though there is no notification from the operator.

(3) Operation of Transport System (3-1) Transport Operation of Article

Figure 3:
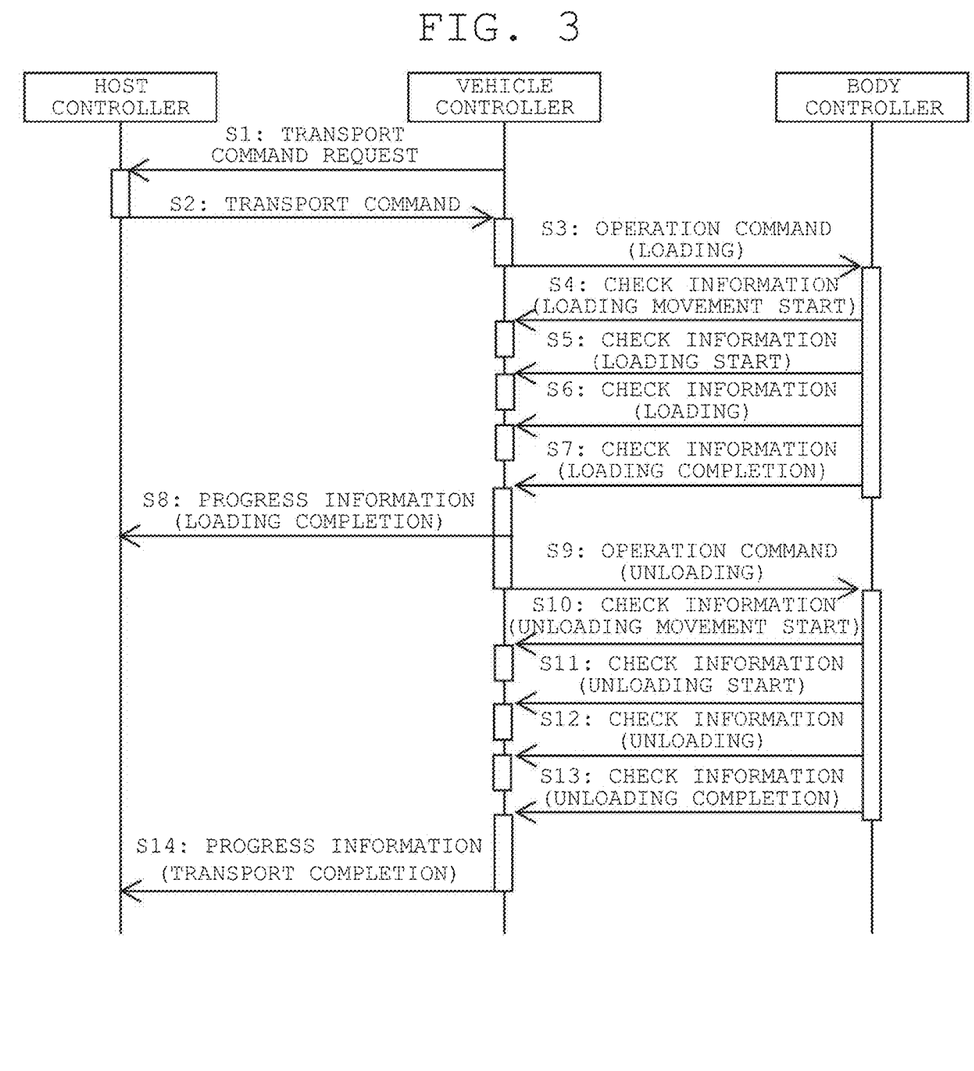
FIG. 3 is a flowchart illustrating a transport operation of an article in the transport system.

An operation of the transport system 100 having the above configuration will be described below. First, a transport operation of the article W in the transport system 100 will be described with reference to FIG. 3. FIG. 3 is a flowchart illustrating the transport operation of the article W in the transport system 100.

The transport of the article W in the transport system 100 is started when the transport controller 20 transmits, to the vehicle controller 30, a notification that the article W to be transported has reached the vicinity of the traveling rail 1*a* by the transport device 3*b* as a transport source of the article W.

In Step S1, the vehicle controller 30 that has received the notification transmits a transport command request to the host controller 40. The transport command request includes information regarding the arrangement position of the transport device 3*b* as the transport source of the article W.

In Step S2, the host controller 40 that has received the transport command request generates a transport command based on the received transport command request, and transmits the transport command to the vehicle controller 30 that has transmitted the transport command request.

The transport command includes information regarding the arrangement position of the transport device 3*b* as the transport source of the article W and information regarding the arrangement position of the transport device 3*a* as a transport destination of the article W.

In Step S3, the vehicle controller 30 that has received the transport command generates an operation command for performing an operation (a loading operation) of transferring the article W from the transport device 3*b* to the vehicle 1 in the transport source of the article W, based on the received transport command. Then, the vehicle controller 30 transmits the operation command to the body controller 10.

The operation command generated in Step S3 includes a command to move a specific vehicle 1 to the arrangement position of the transport device 3*b* that is the transport source of the article W, and a command to transfer the article from the transport device 3*b* to the vehicle 1 at this position.

The body controller 10 that has received the operation command for performing the loading operation controls the vehicle 1 based on the operation command. Specifically, the body controller 10 performs traveling control of moving the specific vehicle 1 to the arrangement position of the transport device 3*b* as the transport source of the article W. Then, the body controller 10 performs control of transferring the article W from the transport device 3*b* as the transport source to the placement portion 1*b* of the vehicle 1.

In Steps S4 to S7, in the middle of performing the loading operation, the body controller 10 determines the operation status of each vehicle 1, and generates and stores check information indicating the determined operation status. The body controller 10 transmits the generated check information to the vehicle controller 30. The vehicle controller 30 stores the received check information.

Specifically, in Step S4, the body controller 10 that has commanded a loading movement operation to the vehicle 1 determines "loading movement start" as the operation status, generates and stores check information indicating "loading movement start", and transmits the check information to the vehicle controller 30.

In addition, for example, when the sensor or the like is provided in the vehicle 1, the body controller 10 may determine "loading movement start" as the operation status, when the movement of the vehicle 1 is detected by the sensor of the vehicle 1 after a command of the loading movement operation.

The vehicle 1 arrives at the transport device 3*b* being the transport source. In Step S5, the body controller 10 that has commanded transfer of the article W from the transport device 3*b* to the vehicle 1 determines "loading start" as the operation status, generates and stores check information indicating "loading start", and transmits the check information to the vehicle controller 30.

In addition, for example, when the sensor or the like is provided in the vehicle 1, the body controller 10 may determine "loading start" as the operation status at a timing at which the sensor detects the movement of the article W from the transport device 3*b* to the vehicle 1 after the sensor of the vehicle 1 detects the stop of the vehicle 1.

Then, in Step S6, during a period after transfer of the article W from the transport device 3*b* to the vehicle 1 is commanded (after "loading start" is determined) until loading of the article W onto the vehicle 1 is completed, the body controller 10 determines "loading" as the operation status, generates and stores check information indicating "loading", and transmits the check information to the vehicle controller 30.

Furthermore, in Step S7, the body controller 10 that has determined that the transfer of the article W to the vehicle 1 has been completed determines "loading completion" as the operation status, generates and stores check information indicating "loading completion", and transmits the check information to the vehicle controller 30.

In Step S8, the vehicle controller 30 that has received the check information indicating the loading completion generates progress information indicating that the loading operation has been completed, and transmits the progress information to the host controller 40. The host controller 40 stores the received progress information.

When transmitting the progress information to the host controller 40, the vehicle controller 30 may transmit the check information itself indicating the loading completion, which has been received from the body controller 10, to the host controller 40 as the progress information without generating new progress information indicating that the loading operation has been completed.

In Step S9, the vehicle controller 30 that has received the check information indicating the loading completion generates an operation command for performing an operation (an unloading operation) of transferring the article W from the vehicle 1 to the transport device 3*a* in the transport destination of the article W, based on the transport command received in Step S2. Then, the vehicle controller 30 transmits the operation command to the body controller 10.

The operation command generated in Step S9 includes a command to move the vehicle 1 that has completed the loading operation to the arrangement position of the transport device 3*a* that is the transport destination of the article W, and a command to transfer the article W from the vehicle 1 to the transport device 3*a* at this position.

The body controller 10 that has received the operation command for performing the unloading operation controls the vehicle 1 based on this operation command. Specifically, the body controller 10 performs traveling control of moving the vehicle 1 that has completed the loading operation to the arrangement position of the transport device 3*a* as the transport destination of the article W. Then, the body controller 10 performs control of transferring the article W from the vehicle 1 to the transport device 3a that is the transport destination.

In Steps S10 to S13, in the middle of performing the unloading operation, the body controller 10 determines the operation status of each vehicle 1, and generates and stores check information indicating the determined operation status. The body controller 10 transmits the generated check information to the vehicle controller 30. The vehicle controller 30 stores the received check information.

Specifically, in Step S10, the body controller 10 that has commanded an unloading movement operation to the vehicle 1 determines "unloading movement start" as the operation status, generates and stores check information indicating "unloading movement start", and transmits the check information to the vehicle controller 30.

In addition, for example, when the sensor or the like is provided in the vehicle 1, the body controller 10 may determine "unloading movement start" as the operation status, when the movement of the vehicle 1 is detected by the sensor of the vehicle 1 after a command of the unloading movement operation.

The vehicle 1 arrives at the transport device 3a being the transport destination. In Step S11, the body controller 10 that has commanded transfer of the article W from the vehicle 1 to the transport device 3a determines "unloading start" as the operation status, generates and stores check information indicating "unloading start", and transmits the check information to the vehicle controller 30.

In addition, for example, when the sensor or the like is provided in the vehicle 1, the body controller 10 may determine "unloading start" as the operation status at a timing at which the sensor detects the movement of the article W from the vehicle 1 to the transport device 3a after the sensor of the vehicle 1 detects the stop of the vehicle 1.

Then, in Step S12, during a period after transfer of the article W from the vehicle 1 to the transport device 3a is commanded (after "unloading start" is determined) until unloading of the article W from the vehicle 1 is completed, the body controller 10 determines "unloading" as the operation status, generates and stores check information indicating "unloading", and transmits the check information to the vehicle controller 30.

Furthermore, in Step S13, the body controller 10 that has determined that the transfer of the article W from the vehicle 1 to the transport device 3a being the transport destination has been completed determines "unloading completion" as the operation status, generates and stores check information indicating "unloading completion", and transmits the check information to the vehicle controller 30.

In Step S14, the vehicle controller 30 that has received the check information indicating the unloading completion generates progress information indicating that the transport of the article W has been completed, and transmits the progress information to the host controller 40. The host controller 40 stores the received progress information.

When transmitting the progress information to the host controller 40, the vehicle controller 30 may transmit the check information itself indicating the unloading completion, which has been received from the body controller 10, to the host controller 40 as the progress information without generating new progress information indicating that the unloading operation has been completed.

As described above, in the transport system 100, while the vehicle 1 is performing the operation related to the transport of the article W, the body controller 10 determines the operation status of the vehicle 1, and generates and stores the check information. The generated check information is transmitted to the vehicle controller 30 and stored in the vehicle controller 30. In this manner, it is possible to share the operation status of the vehicle 1 between the body controller 10 and the vehicle controller 30.

The progress information regarding the progress of the transport of the article W is stored based on the check information received by the vehicle controller 30. The progress information is transmitted to the host controller 40 and stored in the host controller 40. In this manner, it is possible to share the progress status of the transport of the article W in the transport system 100 between the vehicle controller 30 and the host controller 40.

(3-2) Restart Operation of Transport System

Figure 4:
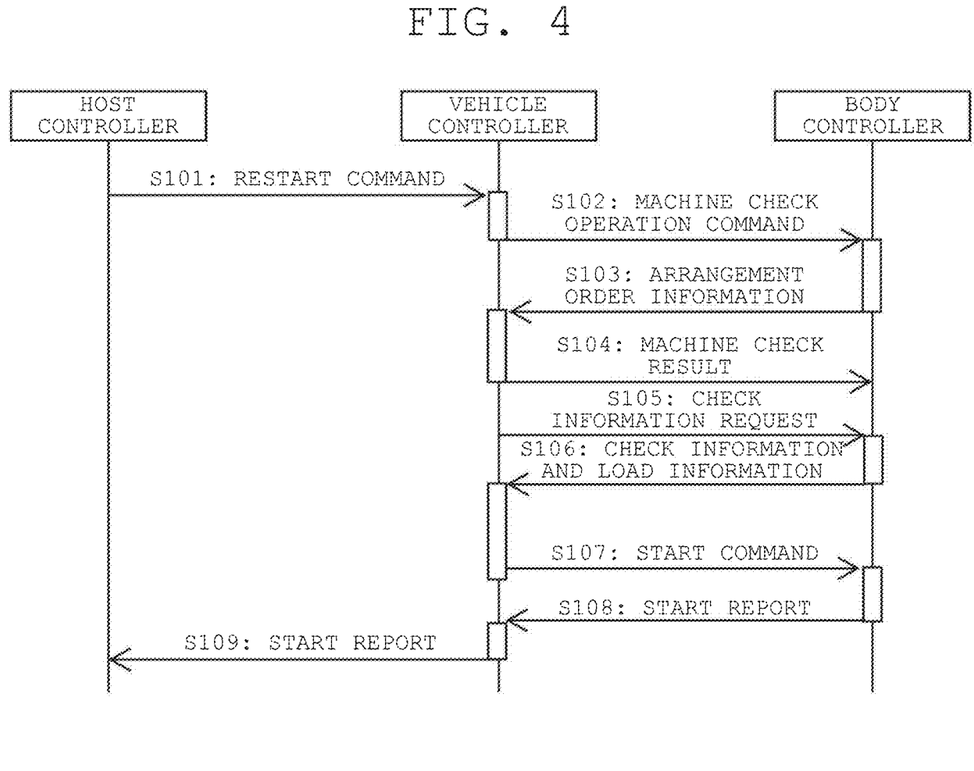
FIG. 4 is a flowchart illustrating a restart operation of a normal transport system.

An operation when the transport system 100 is restarted will be described with reference to FIG. 4. FIG. 4 is a flowchart illustrating a restart operation of the normal transport system 100. The restart operation illustrated in FIG. 4 is an operation when the transport system 100 is restarted by the operator operating the restart command generator 50 after the transport system 100 is stopped due to a problem.

The problem that causes the stop of the transport system 100 occurs, for example, when power supply to each component or element of the transport system 100 is cut off due to power failure, when the vehicle 1 and the transport devices 3a and 3b fail to transfer the article W, when it is detected that an intrusion door (not illustrated) provided in the transport system 100 is open, when a fire notification is made, when an earthquake is detected, or the like.

The body controller 10 and/or the vehicle controller 30 store initial arrangement order information in the transport system 100, in advance. For example, the initial arrangement order information may be information input in advance by the operator, may include default information as a reference, or may be blank information in which nothing is described.

When the restart command generator 50 is operated and an instruction of restart is issued, the host controller 40 transmits the restart command to the vehicle controller 30 in Step S101.

The vehicle controller 30 that has received the restart command starts an operation for restarting the transport system 100. First, in Step S102, the vehicle controller 30 commands the body controller 10 to perform the machine check operation.

The body controller 10 commanded to perform the machine check operation first performs traveling control of causing the vehicle 1 to make one round of the traveling rail 1a in order to cause the vehicle 1 to pass through the load detector 7 and the reader 9.

During a period in which the vehicle 1 makes one round of the traveling rail 1a, the reader 9 provided at the second position P2 reads an identification number of each vehicle 1 that has passed through the second position P2. The body controller 10 generates arrangement order information by arranging the identification numbers of the vehicles 1 in order of the reader 9 reading the identification numbers.

During a period in which all the vehicles 1 make one round of the traveling rail 1a, the load detector 7 provided at the first position P1 detects whether the article W is placed on each vehicle 1 that has passed through the first position P1. The body controller 10 generates the load information in association with a detection result of whether the article W is placed on the vehicle 1 and the identification number of the vehicle 1, which has been read by the reader 9.

As described above, the load detector 7 and the reader 9 are close to each other. Thus, the detection result of whether or not the article W is placed on the vehicle 1 and the identification number of the vehicle 1 are acquired substantially simultaneously. Thus, the body controller 10 generates the load information in association with the detection result of the article W and the identification number of the vehicle 1, which have been acquired simultaneously or with a slight time shift.

As described above, the machine check operation is performed based on the pieces of information acquired by the load detector 7 and the reader 9 provided near the traveling rail 1a. Thus, it is not necessary to provide a sensor or the like that acquires information for performing the machine check operation for each vehicle 1, and thus, it is possible to reduce the cost of the transport system 100.

After generating the arrangement order information and the load information, the body controller 10 transmits the arrangement order information to the vehicle controller 30 in Step S103.

The vehicle controller 30 that has received the arrangement order information performs the machine check process of checking consistency between the arrangement order information received from the body controller 10 and the arrangement order information managed by the vehicle controller 30. When it is determined that the two pieces of arrangement order information do not have consistency, the vehicle controller 30 updates the arrangement order information managed by the vehicle controller 30 so as to have consistency with the arrangement order information received from the body controller 10.

After performing the machine check process, the vehicle controller 30 transmits the updated arrangement order information to the body controller 10 as a result of the machine check process, in Step S104.

When there is no consistency between the updated arrangement order information received from the vehicle controller 30 and the arrangement order information managed by the body controller 10, the body controller 10 stops the restart operation. The above process is performed, for example, when only the vehicle controller 30 is extended in function.

When it is determined that the updated arrangement order information received from the vehicle controller 30 and the arrangement order information managed by the body controller 10 do not have consistency, the vehicle controller 30 does not have to update the arrangement order information managed by the vehicle controller 30 so as to have consistency with the arrangement order information received from the vehicle controller 30. In this case, the vehicle controller 30 may stop the restart operation when it is determined that there is no consistency.

Examples of a case where there is no consistency between the updated arrangement order information received from the vehicle controller 30 and the arrangement order information managed by the body controller 10 include (1) a case where the vehicle 1 determined to be operable in the arrangement order information managed by the body controller 10 is determined to be inoperable in the arrangement order information of the vehicle controller 30, (2) a case where information regarding the vehicle 1 determined to be operable in the arrangement order information managed by the body controller 10 is not included in the arrangement order information of the vehicle controller 30, and the like.

After performing the machine check process, the vehicle controller 30 performs the consistency process. When performing the consistency process, the vehicle controller 30 transmits a check information request to the body controller 10 in Step S105. The check information request is a command to request transmission of the check information and the load information stored in the body controller 10 to the vehicle controller 30.

In Step S106, the body controller 10 that has received the check information request transmits the stored check information and load information to the vehicle controller 30 at a timing at which the check information request has been received.

After receiving the check information from the body controller 10, the vehicle controller 30 performs the consistency process for all the vehicles 1 determined to be operable in the arrangement order information based on (1) the check information received from the body controller 10 and stored in the vehicle controller 30 when the transport system 100 is normal, (2) the check information received from the body controller 10 when the transport system 100 stops due to a problem and the restart command is issued, and (3) the load information described above (i.e., whether or not the article W is placed on the vehicle 1).

If it is determined by the consistency process that there is consistency between the state of the vehicle 1, which is determined by the body controller 10, and the state of the vehicle 1, which is determined by the vehicle controller 30, the vehicle controller 30 transmits a start command to the body controller 10 in Step S107.

The start command is a command to make the transport system 100 be operable by making the vehicle 1 (and the transport devices 3a and 3b) and the like be operable.

The body controller 10 that has received the start command makes the transport system 100 be operable by making the vehicle 1 and the like be operable. When the transport system 100 becomes operable, the body controller 10 transmits, to the vehicle controller 30, a message (start report) indicating that the transport system 100 becomes operable in Step S108.

Then, in Step S109, the vehicle controller 30 further transmits, to the host controller 40, a message indicating that the transport system 100 becomes operable, and thus the restart of the transport system 100 is completed.

If it is determined by the consistency process that the state of the vehicle 1, which is determined by the body controller 10, and the state of the vehicle 1, which is determined by the vehicle controller 30, does not largely have contradiction but have no consistency, the vehicle controller 30 determines that a problem has occurred in the vehicle 1 in which there is inconsistency between the states determined by the two controllers.

When there is the vehicle 1 in which the problem has occurred, in the transport system 100, a process (cancellation process) of canceling the check information regarding the vehicle 1 in which the problem has occurred and/or a process (rejection process) of dispensing the article W placed on the placement portion 1b for transport by the vehicle 1 to the dispenser 5 is performed.

When there is the vehicle 1 in which the problem has occurred, whether the cancellation process is performed, the rejection process is performed, or both of the two processes are performed is determined in accordance with the type of the inconsistency occurring between the states of the vehicle 1, which have been determined by the two controllers.

For example, when some pieces of check information are stored in the body controller 10 but no check information is stored in the vehicle controller 30, it is determined that inconsistency that pieces of the check information stored in the body controller 10 and the vehicle controller 30 do not coincide with each other has occurred. Thus, the cancellation process of canceling the check information of the body controller 10 is performed.

In addition, for example, when the article W is not placed on the vehicle 1 in which the problem has occurred, but the check information indicating the loading completion or the check information (unloading start, unloading) regarding the unloading operation is stored in the body controller 10 and the vehicle controller 30, it is determined that the inconsistency has occurred due to the article W being removed from the vehicle 1 for some reasons. Thus, the cancellation processing of canceling the stored check information is performed.

For example, when the article W is placed on the vehicle 1 in which the problem has occurred, but the check information is stored in neither the body controller 10 nor the vehicle controller 30, it is determined that the inconsistency has occurred due to the article W being unintentionally disposed on the vehicle 1. Thus, the rejection process of dispensing the article W placed on the vehicle 1 in which the problem has occurred is performed.

For example, when the article W is placed on the vehicle 1 in which the problem has occurred and some pieces of check information are stored in the body controller 10, but the check information is not stored in the vehicle controller 30, it is determined that inconsistency that pieces of the check information stored in the body controller 10 and the vehicle controller 30 do not coincide with each other has occurred. Thus, the cancellation process of canceling the check information of the body controller 10 and the rejection process of dispensing the article W placed on the vehicle 1 in which the problem has occurred are performed.

(3-3) Cancellation Process

Figure 5:
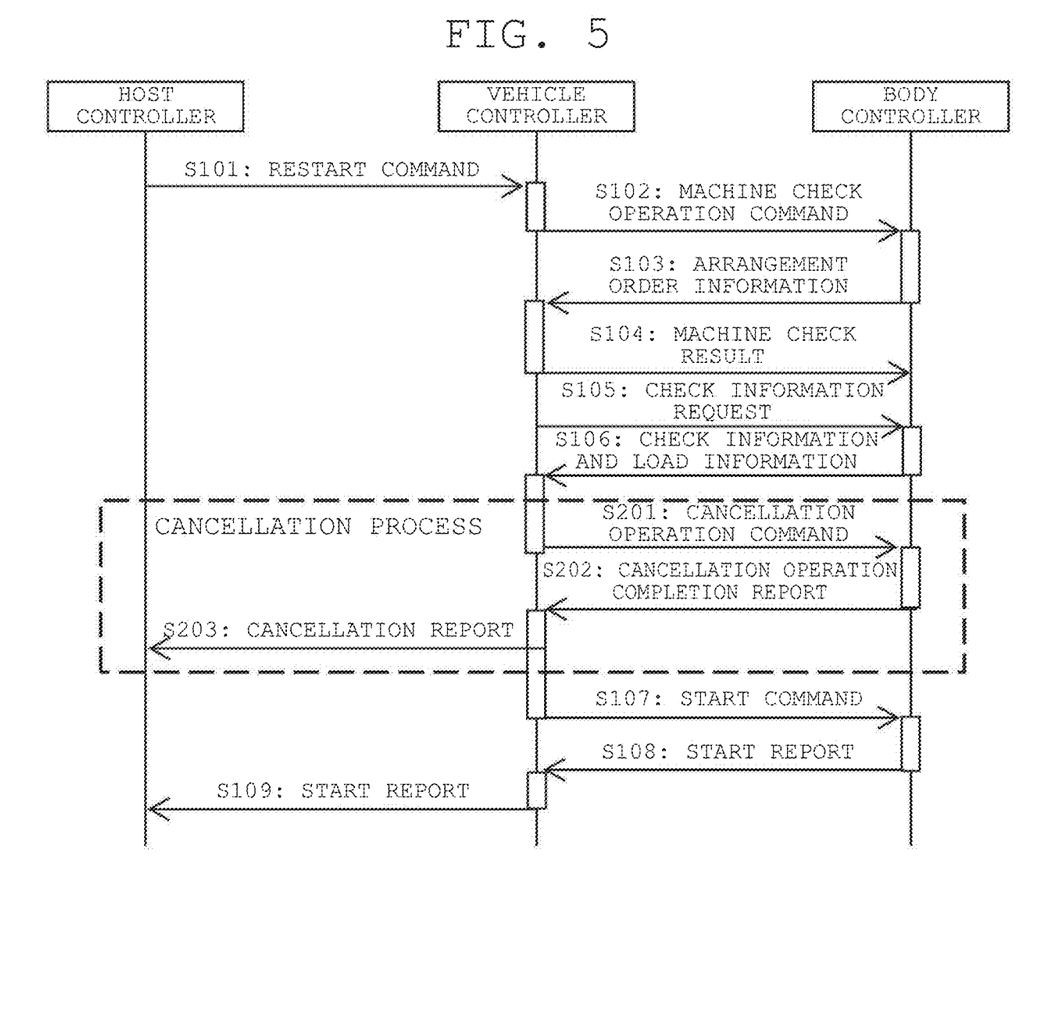
FIG. 5 is a flowchart illustrating the restart operation when a cancellation process is performed.

Specific operations of the transport system 100 in the cancellation process and rejection process will be described below. First, the specific operation of the cancellation process in the transport system 100 will be described below with reference to FIG. 5. FIG. 5 is a flowchart illustrating the restart operation when the cancellation process is performed. In the flowchart of the restart operation illustrated in FIG. 5, the cancellation process is realized by processes (Steps S201 to S203) included in an area surrounded by the broken line.

The processes of Steps S201 to S203 are performed when the check information and the load information are transmitted from the body controller 10 to the vehicle controller 30 in Step S106, and then the vehicle controller 30 performs the consistency process and determines to perform the cancellation process.

When it is determined to perform the cancellation process as a result of the consistency process, in Step S201, the vehicle controller 30 transmits, to the body controller 10, a command (a cancellation operation command) to cancel the check information which is the check information of the vehicle 1 determined to have a problem by the consistency process and is determined to be canceled among pieces of the check information stored in the body controller 10.

The body controller 10 that has received the cancellation operation command cancels the check information commanded to perform cancellation in the received cancel operation command from the body controller 10.

Then, in Step S202, the body controller 10 cancels the check information to be canceled and transmits a message indicating that a cancellation operation has been completed (cancellation operation completion report) to the vehicle controller 30.

When receiving the cancellation operation completion report, the vehicle controller 30 cancels the check information to be canceled if there is the check information to be canceled among the pieces of check information stored in the vehicle controller 30. Then, in Step S203, the vehicle controller 30 cancels the check information to be canceled and transmits a message indicating that the cancellation process has ended (cancellation report) to the host controller 40.

The host controller 40 that has received the cancellation report cancels the progress information corresponding to the check information canceled by the cancellation process, as necessary.

In another preferred embodiment, the vehicle controller 30 that has received the cancellation operation completion report does not have to cancel the check information to be canceled and transmit the message indicating that the cancellation process has ended (cancellation report) to the host controller 40.

After the cancellation process (Steps S201 to S203) is performed, Steps S107 to S109 described above are performed to start the transport system 100.

(3-4) Rejection Process

Figure 6:
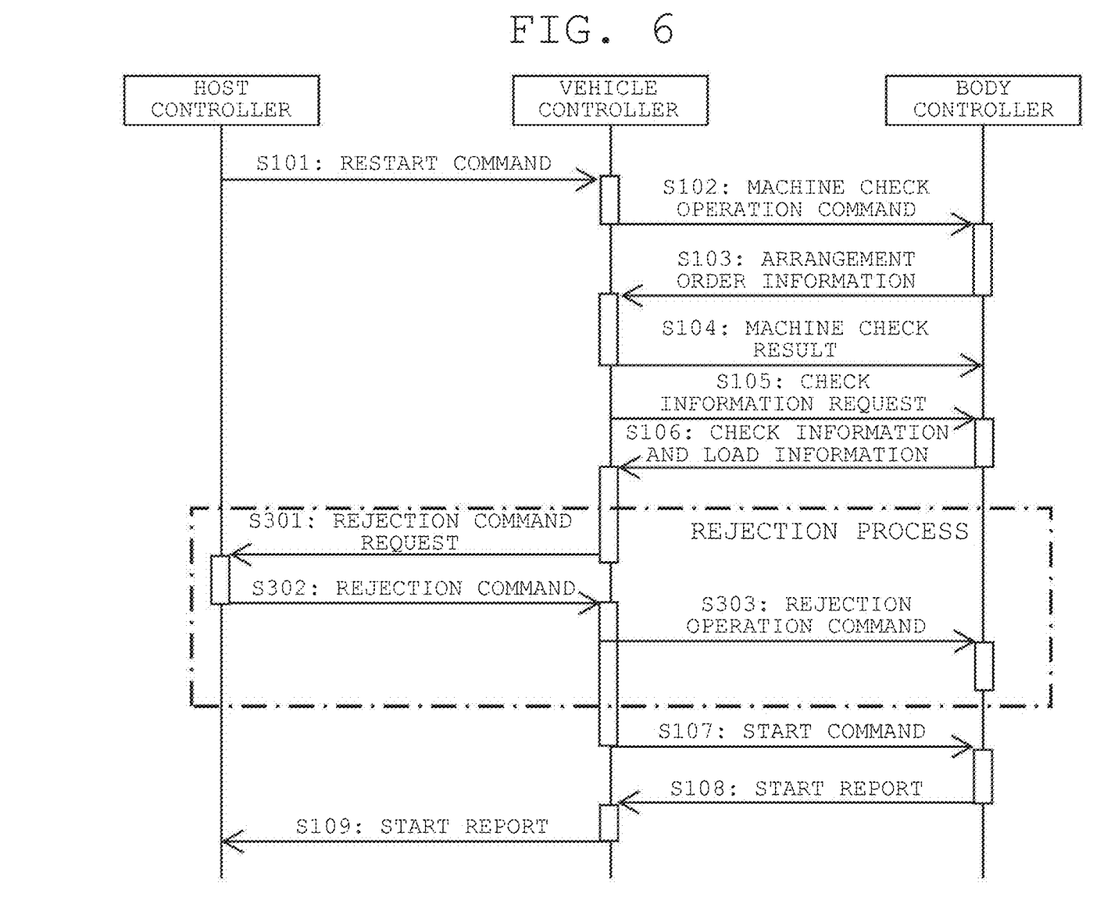
FIG. 6 is a flowchart illustrating the restart operation when a rejection process is performed.

Next, a specific operation of the rejection process in the transport system 100 will be described with reference to FIG. 6. FIG. 6 is a flowchart illustrating the restart operation when the rejection process is performed. In the flowchart of the restart operation illustrated in FIG. 6, the rejection process is realized by processes (Steps S301 to S303) included in an area surrounded by the one-dot chain line.

The processes of Steps S301 to S303 are performed when the check information and the load information are transmitted from the body controller 10 to the vehicle controller 30 in Step S106, and then the vehicle controller 30 performs the consistency process and determines to perform the rejection process.

When it is determined to perform the rejection process as a result of the consistency process, the vehicle controller 30 transmits a request of a command to perform the rejection process (rejection command request) to the host controller 40 in Step S301. The rejection command request includes information (for example, the identification information) regarding the vehicle 1 on which the article W to be dispensed to the dispenser 5 is placed.

In Step S302, the host controller 40 that has received the rejection command request generates a command (a rejection command) to perform the rejection process on the vehicle 1 on which the article W to be dispensed to the dispenser 5 is placed, and transmits the command to the vehicle controller 30.

In Step S303, the vehicle controller 30 that has received the rejection command generates a rejection operation command to command an operation of moving the vehicle 1 on which the article W to be dispensed to the dispenser 5 is placed up to the arrangement position of the dispenser 5 and transferring the article W from the vehicle 1 to the dispenser 5 at this position, based on the received rejection command. Then, the vehicle controller 30 transmits the rejection operation command to the body controller 10.

The body controller 10 that has received the rejection operation command performs the rejection process by performing traveling control of moving the vehicle 1 (that is, the vehicle 1 in which the problem has occurred) on which the article W to be dispensed to the dispenser 5 is placed up to the dispenser 5 in order to stop the transport, and performing control of transferring the article W of which the transport is to be stopped from the vehicle 1 to the dispenser 5 at this position.

After the rejection process (Steps S301 to S303) is performed, Steps S107 to S109 described above are performed to start the transport system 100.

The article W dispensed to the dispenser 5 by the rejection process is transported again. Specifically, for example, information on the article W dispensed to the dispenser 5 and a command to transport the article W are input to the vehicle controller 30 and/or the host controller 40 by the operator or the like. Then, the host controller 40 transmits a transport command of the article W to the vehicle controller 30, so that the dispensed article W is transported.

When both the rejection process and the cancellation process are performed, the cancellation process in Steps S201 to S203 is performed after the consistency process, and thus the check information and the progress information of the vehicle 1 determined to have a problem by the consistency process are canceled.

Then, the cancellation report of the check information and the progress information canceled by the cancellation process is issued, and the rejection process in Steps S301 to S303 is further performed. Thus, a rejection command to command dispensing of the article W placed on the vehicle 1 of which the check information and the progress information have been canceled by the cancellation process is issued from the host controller 40 to the vehicle controller 30. Then, the rejection process of dispensing the article W from the vehicle 1 of which the check information and the progress information have been canceled by the cancellation process, to the dispenser 5 is performed.

(4) Conclusion

The transport system has the configuration and the function as follows.

A transport system (for example, the transport system 100) includes a vehicle (for example, the vehicle 1), a dispenser (for example, the dispenser 5), a first controller (for example, the body controller 10), a second controller (for example, the vehicle controller 30), and a restart command generator (for example, the restart command generator 50).

The vehicle transports an article (for example, the article W). An article of which transport is to be stopped is dispensed to the dispenser. The first controller controls the vehicle based on an operation command related to the transport of the article, and generates and stores check information indicating an operation status of the vehicle.

The second controller transmits the operation command to the first controller, and receives and stores the check information from the first controller.

The restart command generator commands a restart of the transport system.

When the transport system is stopped due to a problem and then the restart command generator commands a restart of the transport system, the first controller transmits the check information to the second controller.

The second controller performs a consistency process based on the check information received from the first controller and stored in the second controller when the transport system is normal, and the check information received from the first controller when the restart of the transport system is commanded after the transport system is stopped due to the problem. If there is a vehicle determined to have the problem by the consistency process, the second controller commands the first controller to cancel the check information regarding the vehicle and/or to dispense the article supported by the vehicle for the transport to the dispenser.

In the transport system, when the transport system is stopped due to an occurrence of the problem and then a command to restart the transport system is issued, the first controller that controls the vehicle transmits the check information stored and saved when the transport system is restarted, to the second controller.

The second controller performs the consistency process based on the check information which is received from the first controller when the transport system is normal, and stored and saved when the transport system is restarted, and the above check information received from the first controller when the restart of the transport system is commanded after the transport system is stopped due to the problem.

When, as a result of the consistency process, an inconsistency occurs between a state of the vehicle, which is determined by the first controller at time of restarting, and a state of the vehicle, which is determined by the second controller at the time of restarting and when the transport system is normal, it is determined that the problem has occurred in this vehicle.

If there is the vehicle in which the problem has occurred, the second controller commands the first controller to cancel the check information related to the vehicle in which the problem has occurred and/or to dispense the article supported for the transport by the vehicle in which the problem has occurred, to the dispenser.

As described above, consistency between the states of the vehicle, which are determined by the first controller and the second controller is automatically checked. When an inconsistency has occurred between the states of the vehicle, which are determined by the two controllers, the first controller automatically performs a process of deleting the check information of the vehicle in which the inconsistency has occurred, and/or control of dispensing the article supported for the transport by the vehicle in which the inconsistency has occurred.

Thus, when an inconsistency has occurred between information determined by the first controller due to the problem in the transport system and information when the transport system is normal, which is determined by the second controller, it is possible to prevent an occurrence of a situation in which the transport system is abnormally stopped due to the inconsistency.

The transport system further includes a load detector (for example, the load detector 7) that is provided at a first position (for example, the first position P1) of a traveling route (for example, the traveling rail 1a) of the vehicle and detects whether or not the vehicle at the first position supports the article.

In this case, when the restart command generator commands the restart of the transport system, the first controller performs traveling control of causing the vehicle to pass through the first position, and transmits a detection result of whether or not the vehicle that has passed through the first position supports the article, to the second controller. In addition, the second controller performs the consistency process based on the check information received from the first controller and stored in the second controller when the transport system is normal, the check information received from the first controller when the restart of the transport system is commanded after the transport system is stopped due to a problem, and the detection result.

Thus, it is possible to determine consistency more accurately between the pieces of the information of the vehicle, which are determined by the two controllers including the information on whether or not the article for transport is actually supported by the vehicle.

The transport system further includes a third controller (for example, the host controller 40). The third controller transmits a transport command for generating the operation command to the second controller.

In this case, the second controller transmits progress information regarding a progress status of the transport of the article by the vehicle to the third controller. In addition, if there is a vehicle determined to have a problem by the consistency process, the second controller commands the third controller to cancel the progress information of the vehicle.

Thus, it is possible to eliminate inconsistency in a higher controller (that is, the third controller) that manages the transport of the article in the entire transport system.

The third controller receives a command to cancel the progress information from the second controller, and then commands the second controller to dispense the article supported for the transport by the vehicle of which the progress information is canceled, to the dispenser.

Thus, it is possible to eliminate the inconsistency in the higher controller that manages the transport of the article in the entire transport system.

In the transport system, a plurality of vehicles are present. In addition, each of the plurality of vehicles has a different piece of identification information. In this case, the transport system further includes a reader. The reader is provided at a second position of the traveling route of the vehicle, and reads identification information of the vehicle at the second position.

In addition, when the restart command generator commands the restart of the transport system, the first controller performs traveling control of causing a plurality of vehicles to pass through the second position, generates and stores arrangement order information indicating an arrangement order of the plurality of vehicles in the traveling route, and transmits the arrangement order information to the second controller.

Thus, in the transport system including the plurality of vehicles, it is possible to perform the consistency process in consideration of the arrangement order of the plurality of vehicles.

2. Other Preferred Embodiments

Some preferred embodiments of the present invention have been described above, but the present invention is not limited to the above preferred embodiments, and various modifications can be made without departing from the gist of the present invention. In particular, a plurality of preferred embodiments and alternative preferred embodiments described in the present specification can be freely combined as necessary.

(A) The execution order of each step and the process details of each step described in the flowcharts illustrated in FIGS. 3 to 6 can be changed without departing from the gist of the invention.

(B) The restart command may be automatically transmitted to the vehicle controller 30 when the host controller 40 satisfies a predetermined condition, without operating the restart command generator 50. For example, the host controller 40 can also issue the restart command to the vehicle controller 30 after a predetermined time elapses after a problem occurs in the transport system 100 and the transport system 100 stops.

(C) In the first preferred embodiment described above, each vehicle 1 does not include the own control unit, and the external body controller 10 controls each vehicle 1. However, the present invention is not limited thereto, and the technique described above can also be applied to a transport system in which each vehicle 1 includes a control unit or controller.

(D) In the first preferred embodiment described above, the vehicle 1 is a vehicle that travels on the pair of traveling rails 1a with the thrust generated by the linear motor. However, the present invention is not limited thereto, and the technique described above can also be applied to a transport system having another vehicle such as a stacker crane.

(E) In the first preferred embodiment described above, when both the cancellation process and the rejection process are performed, the rejection process is individually performed after the cancellation process is performed. However, the present invention is not limited thereto, and the cancellation process and the rejection process may be performed simultaneously.

(F) The arrangement position of the dispenser 5 is not limited to the vicinity of the traveling rail 1a. For example, the dispenser 5 may be provided at a position away from the traveling rail 1a. In this case, a rejection line extending from the pair of traveling rails 1a to the dispenser 5 is provided. Preferred embodiments of the present invention can be widely applied to a transport system including a vehicle that transports an article and a controller that controls the vehicle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transport system for transporting an article, the transport system comprising:
   a vehicle to transport the article;
   a dispenser to dispense an article of which transport is to be stopped;
   a first controller configured or programmed to control the vehicle based on an operation command related to the transport of the article, and generate and store check information indicating an operation status of the vehicle;
   a second controller configured or programmed to transmit the operation command to the first controller, receive the check information from the first controller, and store the check information; and
   a restart command generator to command a restart of the transport system; wherein
   when the transport system is stopped due to a problem and then the restart command generator commands the restart of the transport system:
   the first controller is configured or programmed to control transmit the check information to the second controller;
   the second controller is configured or programmed to control perform a consistency process based on (1) the check information received from the first controller and stored in the second controller when the transport system is normal, and (2) the check information received from the first controller by a command of the restart of the transport system after the transport system is stopped due to the problem; and
   if the vehicle is determined to have the problem as determined by the consistency process, the second controller is configured or programmed to command the first controller to cancel the check information regarding the vehicle and/or to dispense the article supported by the vehicle for the transport to the dispenser.

2. The transport system according to claim 1, further comprising:

a load detector that is provided at a first position of a traveling route of the vehicle to detect whether the vehicle at the first position supports the article; wherein the first controller is configured or programmed to:

perform traveling control to cause the vehicle to pass through the first position when the restart command generator commands the restart of the transport system; and transmit to the second controller a detection result of whether the vehicle that has passed through the first position supports the article; and the second controller is configured or programmed to perform the consistency process based on (1) the check information received from the first controller and stored in the second controller when the transport system is normal, (2) the check information received from the first controller by the command of the restart of the transport system after the transport system is stopped due to the problem, and (3) the detection result.

3. The transport system according to claim 1, further comprising:

a third controller configured or programmed to transmit a transport command to generate the operation command to the second controller; wherein the second controller is configured or programmed to transmit, to the third controller, progress information related to a progress status of the transport of the article by the vehicle; and if the vehicle is determined to have the problem as determined by the consistency process, the second controller is configured or programmed to command the third controller to cancel the progress information of the vehicle.

4. The transport system according to claim 3, wherein the third controller is configured or programmed to receive a command to cancel the progress information from the second controller, and then command the second controller to dispense the article supported for the transport by the vehicle to the dispenser when the progress information is canceled.

5. The transport system according to claim 1, wherein a plurality of the vehicles are present;

each of the plurality of vehicles has a different piece of identification information;

the transport system further includes a reader that is provided at a second position of a traveling route of the vehicle to read the identification information of the vehicle at the second position; and when the restart command generator commands the restart of the transport system, the first controller is configured or programmed to:

perform traveling control to cause a plurality of vehicles to pass through the second position;

generate and store arrangement order information indicating an arrangement order of the plurality of vehicles in the traveling route; and transmit the arrangement order information to the second controller.

* * * * *